US011934120B2

(12) United States Patent
Ohta et al.

(10) Patent No.: US 11,934,120 B2
(45) Date of Patent: Mar. 19, 2024

(54) ABNORMALITY DETECTION OF WEB UNIT IN IMAGE FORMING APPARATUS

(71) Applicant: CANON KABUSHIKI KAISHA, Tokyo (JP)

(72) Inventors: Hideki Ohta, Shizuoka (JP); Takayuki Hata, Ibaraki (JP); Junichiro Nakabayashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/054,105

(22) Filed: Nov. 9, 2022

(65) Prior Publication Data

US 2023/0152736 A1 May 18, 2023

(30) Foreign Application Priority Data

Nov. 16, 2021 (JP) ................................ 2021-186663

(51) Int. Cl.
*G03G 15/20* (2006.01)
*G03G 15/00* (2006.01)

(52) U.S. Cl.
CPC ..... *G03G 15/2028* (2013.01); *G03G 15/2025* (2013.01); *G03G 15/2053* (2013.01); *G03G 15/50* (2013.01)

(58) Field of Classification Search
CPC ........... G03G 15/2025; G03G 15/2028; G03G 15/2053; G03G 15/2064; G03G 15/50
See application file for complete search history.

(56) References Cited

U.S. PATENT DOCUMENTS

2007/0140754 A1* 6/2007 Poxon ................ G03G 15/2025 399/327
2015/0234342 A1* 8/2015 Hatazaki ............ G03G 15/2025 399/327
2020/0073314 A1 3/2020 Tamaki
2021/0223723 A1 7/2021 Chikugo
2022/0308508 A1* 9/2022 Hasegawa .......... G03G 15/2025
2023/0030061 A1* 2/2023 Kinoshita .......... G03G 15/2025

FOREIGN PATENT DOCUMENTS

EP 0618515 A1 10/1994
JP S58182673 A 10/1983
JP S58221876 A 12/1983

(Continued)

*Primary Examiner* — Sophia S Chen
(74) *Attorney, Agent, or Firm* — Canon U.S.A., Inc. I.P. Division

(57) ABSTRACT

An image forming apparatus includes a heating rotary member and a pressing rotary member. The pressing rotary member and the heating rotary member form a fixing nip portion and are configured to apply heat and pressure to a toner image carried on a recording medium at the fixing nip portion, thereby fix the toner image onto the recording medium. The image forming apparatus further includes a winding roller configured to wind up a web used to collect toner that is not fixed to the recording medium, a motor configured to rotate the winding roller, a contact member configured to contact an outside surface of the web wound around the winding roller, a variable resistor disposed so as to be able to change a resistance in accordance with a position of the contact member, and a control unit configured to control an amount of rotation of the motor.

9 Claims, 8 Drawing Sheets

(56) References Cited

FOREIGN PATENT DOCUMENTS

| | | | |
|---|---|---|---|
| JP | S6392983 | A | 4/1988 |
| JP | H04182686 | A | 6/1992 |
| JP | H07261591 | A | 10/1995 |
| JP | H10307503 | A | 11/1998 |
| JP | 2001282029 | A | 10/2001 |

* cited by examiner

ABNORMALITY DETECTION OF WEB UNIT IN IMAGE FORMING APPARATUS

BACKGROUND OF THE INVENTION

Field of the Invention

The present invention relates to an image forming apparatus that forms a toner image on a recording medium.

Description of the Related Art

The image forming apparatus includes a fixing unit that fixes an unfixed toner image carried on a recording medium to the recording medium.

The fixing unit includes a pair of rotating members consisting of a heating rotary member and a pressing rotary member. The heating rotary member is rotated and applies heat to the unfixed toner, while the pressing rotary member is rotated and presses the heating rotary member. The heating rotary member and the pressing rotary member form a fixing nip portion therebetween. When a recording medium with unfixed toner being carried thereon is conveyed to the fixing nip portion, the heating rotary member heats the recording medium and the pressing rotary member presses the recording medium, thereby fixing the unfixed toner to the recording medium.

A phenomenon called a "hot offset" may occur in the fixing unit. In the hot offset, too much heat is introduced from the heating rotary member to unfixed toner on a recording medium, which causes the unfixed toner to adhere to the surface of the heating rotary member without being fixed onto the recording medium. Due to the hot offset, the toner adhering to the surface of the heating rotary member (otherwise called "hot-offset toner") is fixed to subsequent recording media, leading to faulty image forming.

To avoid this, a known image forming apparatus is equipped with a web unit for removing the hot-offset toner (Japanese Patent Laid-Open No. 2001-282029). The web unit uses a web made of a nonwoven fabric or the like to remove the hot-offset toner from the heating rotary member.

The web used to clean the surface of the heating rotary member is wound up by a winding roller that rotates. The more the amount of wound web, the greater the outside diameter of the wound web. To wind up the web accurately, the amount of rotation of the winding roller in winding up the web is adjusted in accordance with the outside diameter of the wound web.

A variable resistor is used in the web unit for accurate winding up of the web. In the web unit using the variable resistor, the winding roller is rotated by a motor to wind up the web.

An abnormality in which the winding roller does not rotate and the web is not wound may occur. Even in this case, the fixing operation may continue without noticing the abnormality of the web being not wound up. As a result, the toner is not collected appropriately, the hot-offset toner may adhere to subsequent recording media and thereby deteriorate image quality.

SUMMARY OF THE INVENTION

The present invention provides an image forming apparatus that can reduce the likelihood of deterioration of image quality when an abnormality in which the web is not wound up occurs in the web mechanism that uses a variable resistor.

According to an aspect of the present invention, an image forming apparatus includes a heating rotary member and a pressing rotary member. The pressing rotary member and the heating rotary member form a fixing nip portion and are configured to apply heat and pressure to a toner image carried on a recording medium at the fixing nip portion, thereby fix the toner image onto the recording medium. The image forming apparatus further includes a winding roller configured to wind up a web used to collect toner that is not fixed to the recording medium and is adhered to a surface of the heating rotary member, a motor configured to rotate the winding roller to wind up the web that has been used for the collection of the toner, a contact member configured to contact an outside surface of the web wound around the winding roller and to be movable so as to follow the outside surface of the web, a variable resistor disposed so as to be able to change a resistance in accordance with a position of the contact member, and a control unit configured to control an amount of rotation of the motor in response to information related to the resistance. The control unit is configured to report an abnormality when an amount of variation of the information in a predetermined time period is equal to or less than a predetermined amount.

Further features of the present invention will become apparent from the following description of embodiments with reference to the attached drawings.

DESCRIPTION OF THE EMBODIMENTS

First Embodiment

Image Forming Apparatus

Figure 1:
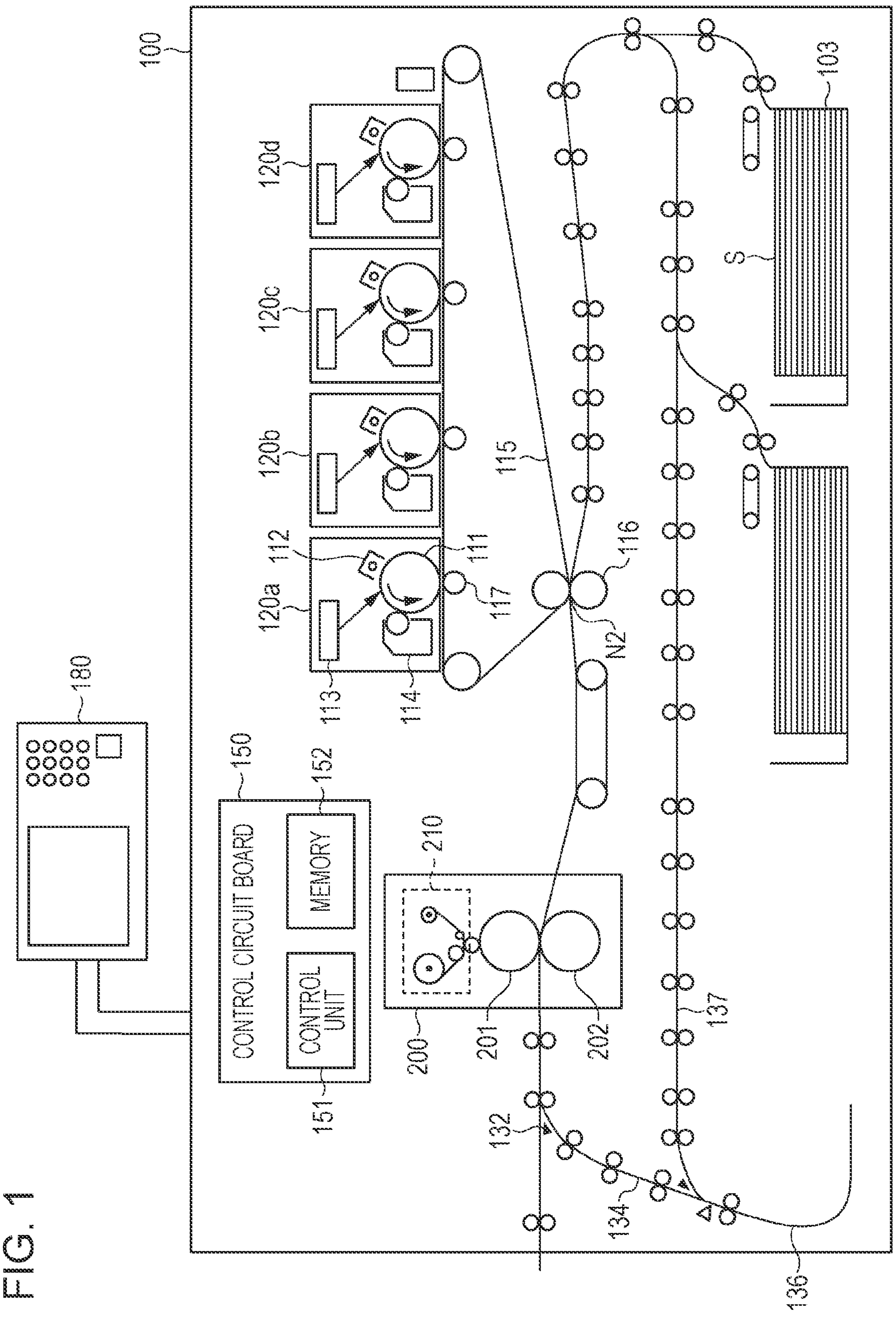
FIG. 1 is a schematic view illustrating a structure of an image forming apparatus.

FIG. 1 is a schematic view illustrating a structure of an image forming apparatus 100. As illustrated in FIG. 1, the image forming apparatus 100 includes four image formation units, in other words, a yellow image formation unit 120*a*, a magenta image formation unit 120*b*, a cyan image formation unit 120*c*, and a black image formation unit 120*d*, which are disposed along an intermediate transfer belt 115 in the rotation direction thereof. The following describes a process of forming a toner image onto the intermediate transfer belt 115 with the yellow image formation unit 120*a* being taken as an example.

First, a charging device 112 uniformly charges the surface of a rotating photosensitive drum 111 with electricity (charging). Subsequently, an exposure device 113 emits laser light to the surface of the photosensitive drum 111 in accordance with an input image data and thereby forms an electrostatic latent image on the photosensitive drum 111 (exposure). Subsequently, a developing device 114 forms a yellow toner image on the photosensitive drum 111 (development). A primary transfer roller 117 applies a voltage, of which the polarity is opposite to the charged polarity of the yellow toner image, to the intermediate transfer belt 115. The yellow toner on the photosensitive drum 111 is thereby transferred to the intermediate transfer belt 115 (primary transfer). Residual yellow toner remaining on the surface of the photosensitive drum after the primary transfer is scraped away from the surface of the photosensitive drum 111 by a toner cleaner. This sequence is performed also in the magenta image formation unit 120*b*, the cyan image formation unit 120*c*, and the black image formation unit 120*d*. As a result, a full-color toner image is formed on the intermediate transfer belt 115.

The toner image on the intermediate transfer belt 115 is conveyed to a secondary transfer portion N2 formed by a secondary transfer roller pair 116. In synchronization with the toner image being conveyed, a recording medium S is picked up one by one from a recording media cassette 103 and fed to the secondary transfer portion N2. Subsequently, the toner image on the intermediate transfer belt 115 is transferred onto the recording medium S (secondary transfer).

The recording medium S on which the toner image has been transferred is conveyed to a fixing unit 200, and the fixing unit 200 fixes the toner image to the recording medium S by applying heat and pressure. The recording medium S with the fixed toner image is discharged to a discharge tray.

The image forming apparatus 100 can also form monochrome images. In the case of monochrome image forming, only the black image formation unit 120*d* is activated.

The following describes a double-sided printing that forms images on both sides of a recording medium S. A recording medium S of which an image has been formed on one side is discharged from the fixing unit 200 and guided by a flapper 132 to a sheet conveyance path 134. The recording medium S is further conveyed from the sheet conveyance path 134 to a reversing path 136 and is switched back along the reversing path 136. The recording medium S subsequently passes a double-sided printing path 137. In this process, the recording medium S is reversed with the top side down. The recording medium S is subsequently conveyed again to the secondary transfer portion N2, another toner image is transferred thereon, and the fixing unit 200 fixes the toner image. The recording medium S with both sides having printed images is discharged to the discharge tray.

The process starting from the charging until the recording medium S to which a toner image is fixed is discharged onto the discharge tray is called an "image forming process" or otherwise called a "print job". In other words, image forming is being performed during the image forming process or during the print job.

Fixing Unit

Next, the fixing unit 200 of the present embodiment is described with reference to FIG. 2.

Figure 2:
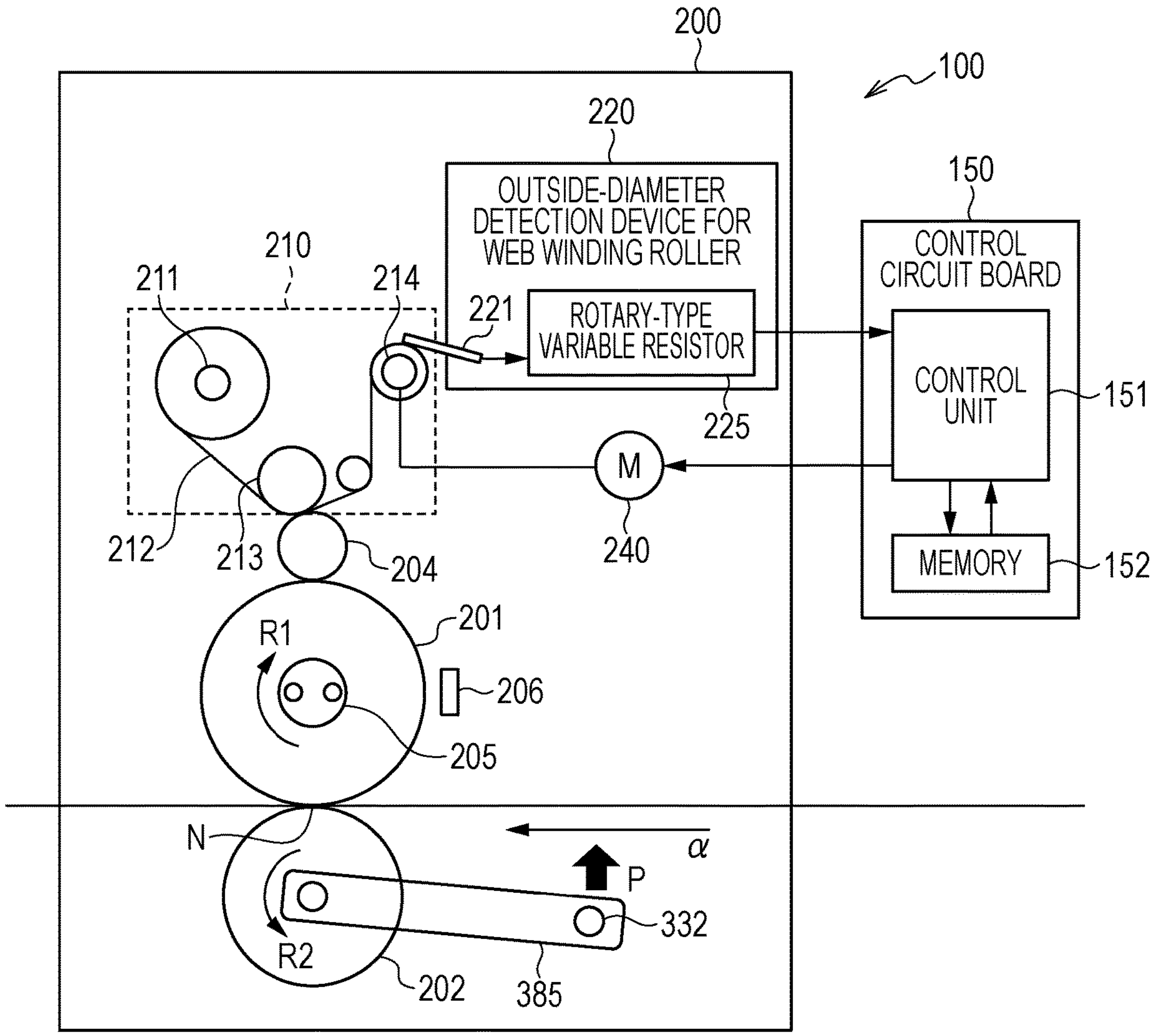
FIG. 2 is a schematic cross-sectional view illustrating a fixing unit and a web unit.

In FIG. 2, a recording medium is conveyed in the direction of arrow a. The fixing unit 200 includes a heating rotary member 201 and a pressing rotary member 202. The heating rotary member 201 has a heat source for heating an unfixed toner image carried on a recording medium S, and the pressing rotary member 202 comes into contact with the outside surface of the heating rotary member 201. The pressing rotary member 202, which is urged toward the heating rotary member 201, applies pressure to the heating rotary member 201, thereby forming a fixing nip portion N between the pressing rotary member 202 and the heating rotary member 201. The toner image is fixed at the fixing nip portion N where the recording medium S is heated and pressed.

The heating rotary member 201 is made of a metal, such as aluminum or stainless steel and is shaped like a hollow cylinder. The heating rotary member 201 is excellent in heat conduction and heat resistance. The heating rotary member 201 of the present embodiment has a rubber layer of a predetermined thickness on the outside surface of the metal core shaped like the hollow cylinder. The rubber layer has a three-tier structure that includes a base layer, an elastic layer formed over the base layer, and a releasing layer formed over the elastic layer. The material of the base layer is polyimide resin (PI). The elastic layer is made of silicone rubber, and the releasing layer is made of a fluoro-resin, such as perfluoroalkoxy alkane or PFA. The releasing layer formed on the outside surface facilitates separation of toner therefrom. The heating rotary member 201 has a heater 205 therein. The heater 205 is the heat source for heating the recording medium. The heater 205 is a halogen heater that produces heat, and the heat is conducted to the surface of the heating rotary member 201. A thermistor 206 is provided to detect the surface temperature of the heating rotary member 201. Fixation is performed when the surface temperature of the heating rotary member 201 reaches a predetermined target temperature required for fixing. The heating rotary member 201 can have multiple heaters 205 that are oriented and distributed differently. Due to the heating rotary member 201 having multiple heaters 205 that are oriented and distributed differently, the heating region can be changed in accordance with the sizes of recording media. The heat source of the heating rotary member 201 is not limited to the halogen heater but may be an induction heating device. The heating rotary member 201 is rotated in the direction of arrow R1 by receiving the driving force of a motor (not illustrated).

The pressing rotary member 202 has an aluminum core shaped like a hollow cylinder. The pressing rotary member 202 also has a one-millimeter-thick elastic layer formed over the core and a releasing layer formed over the elastic layer for facilitating separation of the toner.

The pressing rotary member 202 is rotated in the direction of arrow R2. When a recording medium S is conveyed to the fixing nip portion N formed between the heating rotary member 201 and the pressing rotary member 202, the recording medium S is heated and pressed to fix the toner image thereto.

A connection-separation mechanism is provided to bring the pressing rotary member 202 into contact with the heating rotary member 201 or to detach the pressing rotary member 202 from the heating rotary member 201. The connection-separation mechanism includes a frame 385 and a drive motor (not illustrated). The frame 385 is supported by the image forming apparatus 100. The frame 385 supports the pressing rotary member 202. The frame 385 is rotated about a pivot 332 by receiving the driving force of the drive motor (not illustrated). When the frame 385 is rotated about the pivot 332 by the drive motor in the clockwise direction as viewed in FIG. 2, the pressing rotary member 202 is moved in the direction of arrow P. The pressing rotary member 202 is thereby brought into contact with the heating rotary member 201 in a direction perpendicular to the conveyance direction a of recording media (connection state). The fixing nip portion N is thereby formed. In the present embodiment, the pressing rotary member 202 is pressed against the heating rotary member 201 with a total pressing force of 2000 N. The width of the fixing nip portion N is 24 mm. When the frame 385 is rotated about the pivot 332 in the counterclockwise direction as viewed in FIG. 2, the pressing rotary member 202 is separated from the heating rotary member 201 (separation state).

As described above, the recording medium S carrying the unfixed toner image thereon is nipped and conveyed at the fixing nip portion N by the heating rotary member 201 and the pressing rotary member 202, and the recording medium S is heated and pressed to fix the toner image thereto.

In the fixing unit 200 illustrated in FIG. 2, the fixing nip portion formed by a pair of rollers performs fixation. The method of fixation is not limited to this. For example, the fixing unit 200 may have a belt member, such as a fixing belt, and multiple suspension members, such as a fixing pad and a heating roller, and the suspension members may suspend the belt member.

Web Unit

Next, a web unit 210 and a collection roller 204 are described with reference to FIG. 2.

The fixing unit fixes the toner to the recording medium by heat and pressure. If too much heat is introduced to the toner on the recording medium, the toner on the recording medium melts excessively and may adhere to the heating rotary member 201 without being fixed to the recording medium. This phenomenon is called "hot offset". If the toner adhering to the heating rotary member 201 due to the hot offset is not collected, the hot-offset toner on the heating rotary member 201, which is rotating, is fixed to subsequent recording media. A faulty image may be formed in the region to which the hot-offset toner is fixed.

To prevent this, the web unit 210 for collecting the hot-offset toner is known. The web unit 210 collects the toner adhering to the heating rotary member 201. This reduces the occurrence of faulty image forming due to the hot offset.

The web unit 210 includes a web 212, a supply roller 211, a winding roller 214, and a pressing roller 213.

The collection roller 204 is in contact with the surface of the heating rotary member 201 and is rotated passively. The hot-offset toner melted by the heat at the fixing nip portion N remains on the surface of the heating rotary member 201 in the melted state. The collection roller 204 of the present embodiment has an outside diameter of 20 mm and is made of a stainless steel (SUS303) that has a higher affinity for the melted toner compared with the releasing layer of the heating rotary member 201. Accordingly, the melted toner is transferred to the surface of the collection roller 204.

The toner on the surface of the collection roller 204 is collected therefrom using the web 212 that is made of a nonwoven fabric. The web unit 210 includes the pressing roller 213 that presses the web 212 against the collection roller 204. The web 212 is pressed against the collection roller 204 by the pressing roller 213, thereby forming a predetermined nip width between the web 212 and the collection roller 204. The toner transferred onto the collection roller 204 is collected by the web 212.

The web 212 having been used for collecting the toner is wound up by the winding roller 214. In the present embodiment, the winding roller 214 winds up the web 212, for example, by 0.2 cm at every four A4-size sheets of paper. One end portion of the web 212 is wound around the winding roller 214, and the other end portion of the web 212 is wound around the supply roller 211. The portion of the web 212 wound around the supply roller 211 is an unused portion. When the winding roller 214 winds up the web 212, the unused portion of the web 212 is supplied from the supply roller 211. The unused portion of the web 212 is thereby supplied to the contact portion between the web and the collection roller 204 to collect the toner adhering to the surface of the heating rotary member 201.

The web 212 is made, for example, of a nonwoven fabric having a total length of about 50 m. The web 212 is consumed to collect the toner during the fixation for recording media, and finally the web 212 needs to be replaced with a new one. When the web 212 for collecting the toner runs out, a user of the image forming apparatus 100 calls a serviceperson to replace the web unit 210 with a new one. The longer the lifespan of the web unit 210, the better it is, because the number of calling the serviceperson depends on the lifespan of the web unit 210. The "new web" as used above is the one that is not yet used for toner collection.

The following is the reason why the toner is collected by the web 212 indirectly via the collection roller 204. The web 212 is made of a nonwoven fabric or the like. If the web 212 comes into direct contact with the heating rotary member 201 without using the collection roller 204, the web 212 accelerates the surface deterioration of the heating rotary member 201. The acceleration of the surface deterioration increases the number of replacements of the heating rotary member 201. To prevent this, the metallic collection roller 204 is provided to collect the toner from the heating rotary member 201. Accordingly, the web 212 does not come into direct contact with the heating rotary member 201, which can prolong the lifespan of the heating rotary member 201. In addition, the surface roughness of the heating rotary member 201 affects the glossiness of images formed on recording media. If the web 212 comes into direct contact with the surface of the heating rotary member 201, the web 212 produces irregularities on the surface of the heating rotary member 201. This may cause irregularity in glossiness of images formed on recording media. Accordingly, the web 212 collects the toner via the collection roller 204, and the web 212 does not come into direct contact with the heating rotary member 201, which reduces the occurrence of irregularity in glossiness.

Web Unit Connection Mechanism

The web unit 210 has a mechanism (not illustrated) for bringing the web 212 into contact with the collection roller 204 and for separating the web 212 from the collection roller 204. The collection roller 204 has a mechanism (not illustrated) for bringing the collection roller 204 into contact with the heating rotary member 201 and for separating the collection roller 204 from the heating rotary member 201. When a print job is not received by a control unit 151, the collection roller 204 is separated from the heating rotary member 201. When a print job is received by the control unit 151, the collection roller 204 is brought into contact with the heating rotary member 201, which increases the surface temperature of the collection roller 204. This causes the toner on the surface of the heating rotary member 201 to move easily to the collection roller 204. After the surface temperature of the collection roller 204 rises sufficiently, the web 212 is brought into contact with the collection roller 204 approximately one second before a recording medium is conveyed to the fixing nip portion. The web 212 remains in contact with the collection roller 204 and the collection roller 204 also remains in contact with the heating rotary member 201 until the print job is completed.

When the last recording medium S finishes passing the fixing nip portion N at the time of completion of the print job, the web 212 is separated from the collection roller 204.

Control of Amount of Rotation of Winding Roller in Accordance with Outside Diameter of Wound Web The winding roller 214 is activated to wind up a used portion of the web 212. As the winding roller 214 winds up the used portion of the web 212 and the wound portion of the web 212 increases, the outside diameter of the web 212 wound around the winding roller 214 increases. If the amount of rotation of the winding roller 214 were set to be constant, the winding rate of the web 212 would increase as the outside diameter of the wound web 212 increases. Accordingly, it would be difficult to wind a constant amount of the web 212 unless the amount of rotation of the winding roller 214 is controlled in accordance with the outside diameter of the wound web 212. If the amount of rotation of the winding roller 214 were set to be constant without taking into account of the outside diameter of the wound web 212, the amount of web consumption would increase uselessly as the winding amount of the web 212 increases, which would shorten the service life of the web 212.

It is a known practice, however, to control the amount of rotation of the winding roller 214 while taking into account of the outside diameter of the wound web 212.

Winding Mechanism Using Variable Resistor and Motor

Figure 3A:
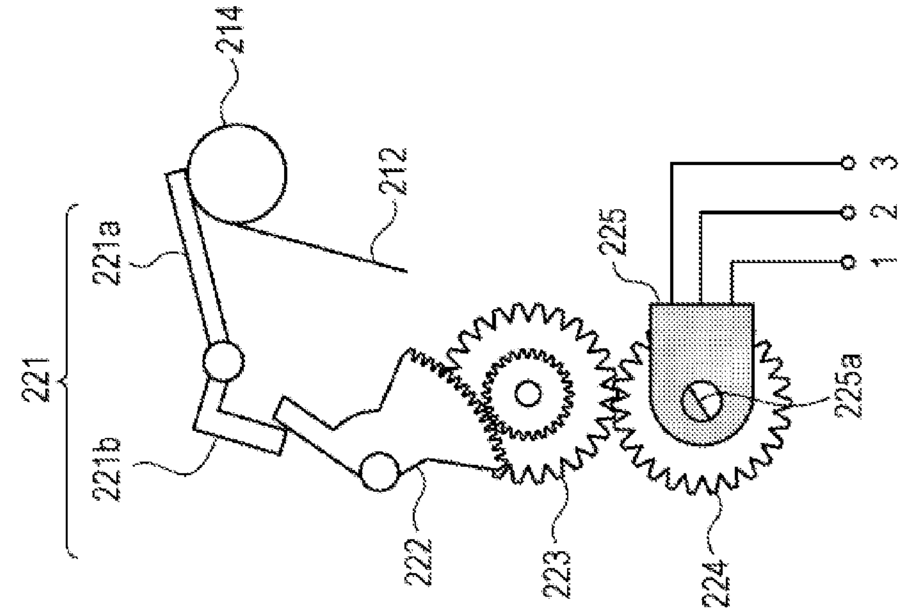
FIGS. 3A and 3B are schematic views illustrating a structure of an outside-diameter detection device.
Figure 3B:
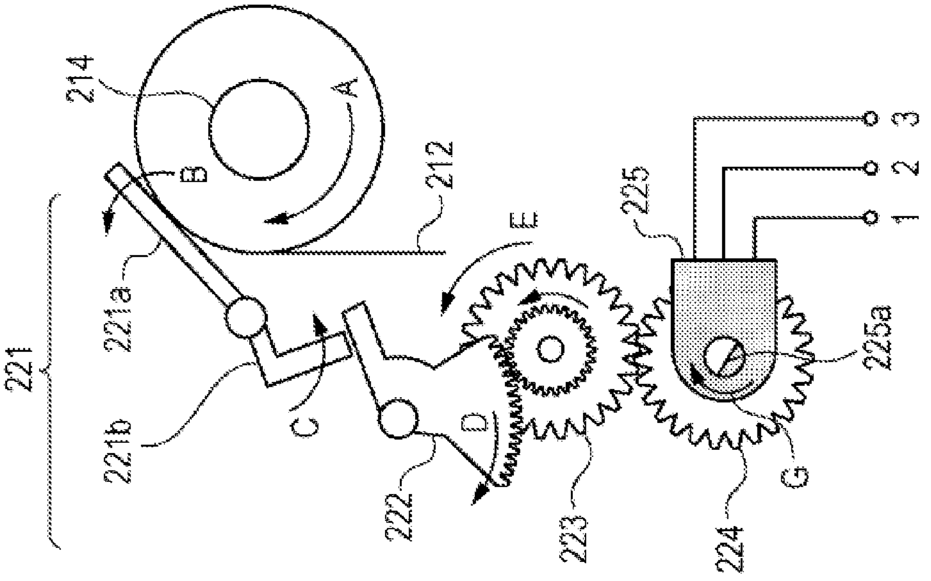

The following describes a method of controlling the winding amount of the web 212 in accordance with the outside diameter of the wound web 212. According to the present embodiment, as illustrated in FIGS. 3A and 3B, a variable resistor 225 converts the outside diameter of the wound web 212 into a resistance in collaboration with a contact member 221. This mechanism is described first as below.

The fixing unit 200 includes an outside-diameter detection device 220 that detects the outside diameter of the wound web. FIGS. 3A and 3B are schematic views illustrating an example structure of the outside-diameter detection device 220 according to the present embodiment. FIG. 3A illustrates a state of the outside-diameter detection device 220 when the web unit 210 is new and the web 212 is not wound yet by the winding roller 214. FIG. 3B illustrates a state of the outside-diameter detection device 220 after the web 212 is wound up by the winding roller 214 in the direction of arrow A and the outside diameter of the web 212 wound around the winding roller 214 increases.

As illustrated in FIGS. 3A and 3B, the contact member 221 of the outside-diameter detection device 220 includes a lever 221*a* that is in contact with, and urged by, the outside surface of the wound web 212. The contact member 221 also includes a portion 221*b* being in contact with a link gear 222. The lever 221*a* of the contact member 221 is rotated in the direction of arrow B in FIG. 3B by following the outside diameter of the wound web 212. The portion 221*b* of the contact member 221 is thereby rotated in the direction of arrow C, and the link gear 222 is thereby rotated in the direction of arrow D. The link gear engages a double-gear 223. Accordingly, when the link gear 222 is rotated in the direction of arrow D, the double-gear 223 is thereby rotated in the direction of arrow E. The double-gear 223 engages a gear portion 224 of the variable resistor 225. The gear shaft of the gear portion 224 of the variable resistor 225 has a cross section shaped like the letter D, and the gear shaft engages a rotating member 225*a* of the variable resistor 225. Accordingly, when the double-gear 223 is rotated in the direction of arrow E, the rotating member 225*a* of the variable resistor 225 is thereby rotated in the direction of arrow G. In short, as the winding roller 214 winds up the web 212 and the outside diameter of the wound web 212 increases, the rotating member 225*a* of the variable resistor 225 is rotated in the direction of arrow G. The resistance of the variable resistor 225 changes in accordance with the amount of rotation of the rotating member 225*a*. As described above, the variable resistor 225 used in the present embodiment is a rotary-type variable resistor or a so-called "rotary potentiometer".

Detected Voltage Vsns Obtained From Resistance of Variable Resistor

Figure 4:
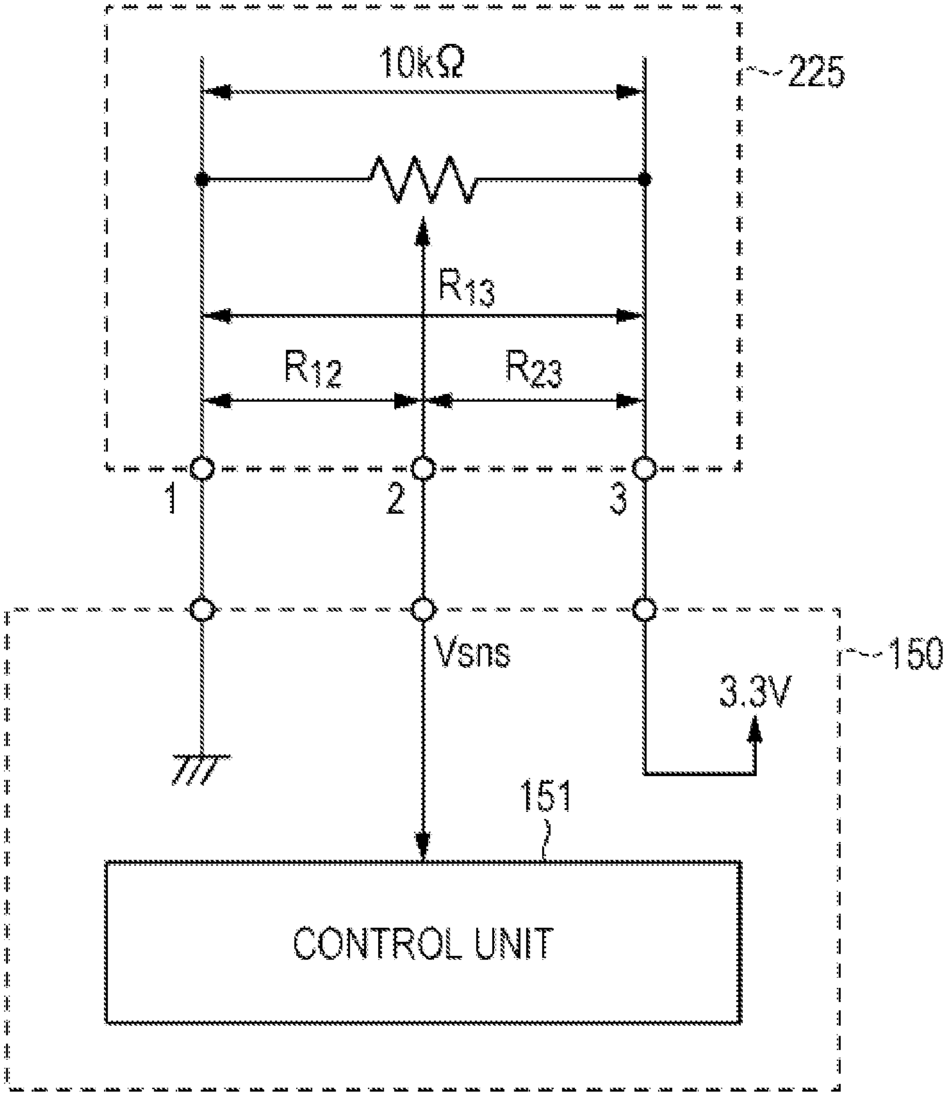
FIG. 4 is a diagram illustrating a detection circuit with a variable resistor.

The following describes the relationship between the rotating member 225*a* of the variable resistor 225 and the resistance with reference to FIG. 4.

FIG. 4 is a diagram illustrating a detection circuit with the variable resistor 225 of the present embodiment. The variable resistor 225 has a terminal 1, a terminal 2, and a terminal 3. The terminals 1 to 3 of the variable resistor 225 of FIG. 4 correspond to the terminals 1 to 3 of the variable resistor 225 of FIGS. 3A and 3B. The terminal 2 is connected to the rotating member 225*a*. A resistance R12 between the terminals 1 and 2 and a resistance R23 between the terminals 2 and 3 change in accordance with the angle (amount of rotation) of the rotating member 225*a*.

The terminals 1 to 3 of the variable resistor 225 are connected to a control circuit board 150, in which the terminal 1 is connected to GND, the terminal 2 is connected to Vsns for a detected voltage and further connected to a terminal of the control unit 151, and the terminal 3 is connected to a 3.3 V power source.

In the present embodiment, the total resistance of the variable resistor between R13 is 10 kΩ. When the angle (amount of rotation) of the rotating member 225*a* of the variable resistor 225 changes and accordingly, the resistance R12 between the terminals 1 and 2 and the resistance R23 between the terminals 2 and 3 change, the following equation hold true.

$$R13=R12+R23=10\ K\Omega \qquad \text{Equation 1}$$

The following describes an example method of calculating information related to the resistance of the variable resistor 225. In the present embodiment, a voltage is calculated from the resistance of the variable resistor 225. The information calculated from the resistance is not limited to this. A current may be calculated from the resistance. The resistance of the variable resistor 225 may be stored in a storage unit 152. The resistance, however, changes in accordance with the ambient temperature. Accordingly, the voltage or the current can be stored in the storage unit 152.

The terminal 3 of the variable resistor 225 is connected to the 3.3 V power source, and the resistance is set by the variable resistor 225. Accordingly, a detected voltage Vsns is input into the control unit 151 that is connected to the terminal 2. The detected voltage Vsns is a voltage obtained by dividing 3.3V by the resistance R12 and the resistance R23, which can be obtained from the following equation.

$$\text{Vsns}=3.3\text{V}\times(R12/(R12+R23)) \qquad \text{Equation 2}$$

Accordingly, the outside diameter of the web 212 wound around the winding roller 214 can be obtained as an electrically detected signal using the detected voltage Vsns.

Relationship Between Detected Voltage and Outside Diameter of Web

Figure 5:
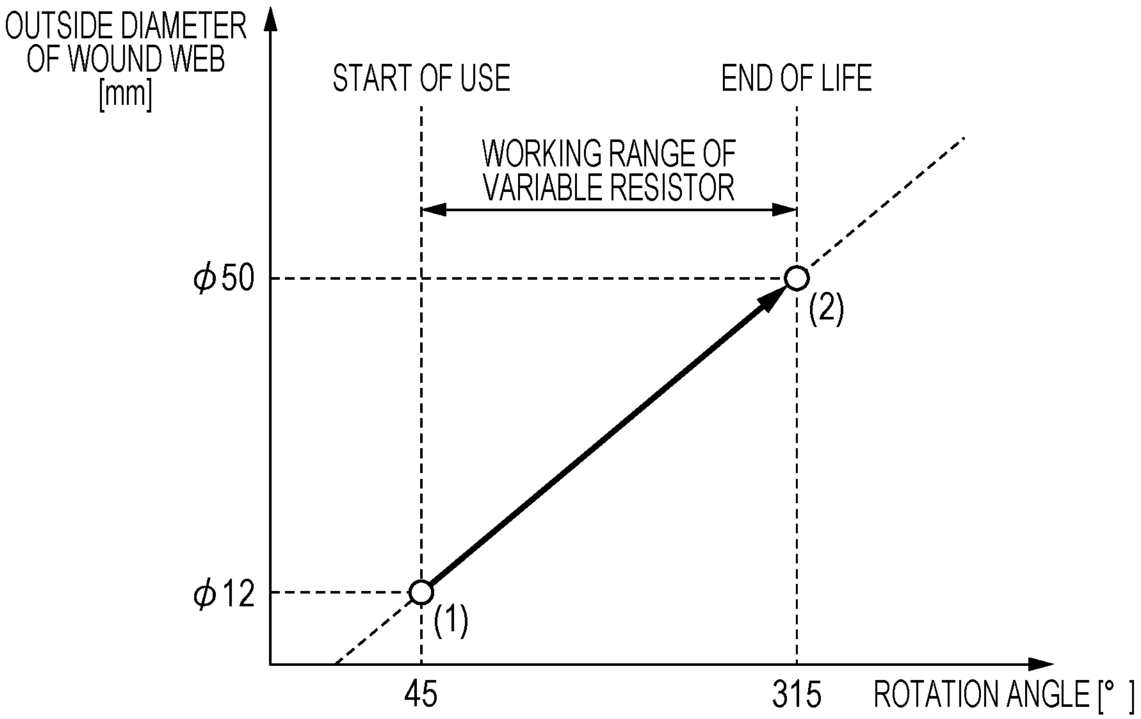
FIG. 5 is a view illustrating a relationship between a rotation angle of the variable resistor and an outside diameter of a wound web.

The relationship between the rotation angle of the variable resistor 225 of the present embodiment and the output voltage is described below with reference to FIG. 5. Assume that the outside diameter of the winding roller 214 of the present embodiment is 12 mm and the outside diameter of the wound web 212 becomes 50 mm when the winding roller 214 fully winds up the web 212 (when all the web 212 is consumed). In FIG. 5, the time at which a virgin web 212 is started to use is indicated by point (1), and the rotation angle of the rotating member 225*a* of the variable resistor 225 is, for example, 45 degrees at point (1). The detected voltage at point (1) is denoted by Va. As the outside diameter of the wound web 212 increases while the web 212 is consumed, the resistance of the variable resistor 225 (the resistance between R12) increases. This increases the detected voltage Vsns until the entire web 212 is consumed at point (2) or at the end of life of the web 212. At point (2), the rotation angle of the rotating member 225*a* of the variable resistor 225 is, for example, 315 degrees. The detected voltage at this point is denoted by Vb. A characteristic line connected between point (1) and point (2) is denoted by TYP. The control unit 151 controls the amount of rotation of a winding motor 240 (to be described later) in accordance with TYP.

The storage unit 152 stores information related to the web 212. The information include the voltage Va detected before shipment and the voltage Vb to be detected at the end of life of the web 212 (end-of-life voltage).

Note that in the present embodiment, the voltage Vb indicates the voltage when the entire web 212 is consumed, and the voltage Vb is calculated from the voltage Va detected before shipment. Accordingly, when the entire web 212 is consumed, the detected voltage Vsns does not always become equal to, or more than, the voltage Vb because the amount of toner collected by the web 212 varies. In other words, the outside diameter of the wound web 212 depends also upon the amount of collected toner. The more the amount of collected toner, the greater the outside diameter of the wound web 212.

In the present embodiment, the voltage Vb is a voltage that indicates the point of time when the entire web 212 is consumed, but the voltage Vb is not limited to this. The voltage Vb may be a voltage for urging a user to replace the web 212 when the remaining amount of the web 212 reaches a predetermined value or less.

Web Winding by Winding Motor

The following describes how the control unit 151 controls a winding motor 240 in accordance with obtained voltages with reference to FIG. 2. The control unit 151, which is electrically connected to the terminal of the variable resistor 225, can obtain the resistance of the variable resistor 225. The control unit 151 can obtain the detected voltage Vsns using Equation 2. The control unit 151 is also connected to the winding motor 240. The “winding motor 240” here is a motor provided to rotate the winding roller 214. The control unit 151 controls the amount of rotation of the winding motor 240 in accordance with the detected voltage Vsns obtained. More specifically, in the present embodiment, the winding roller 214 winds up the web 212 by 0.2 cm at one operation. According to the present embodiment, with this amount of winding, the toner on the surface of the heating rotary member 201 can be collected, and the likelihood of faulty image forming can be reduced for subsequent recording media. Accordingly, 0.2 cm is a desirable amount of the web 212 to be wound up by one operation of the winding roller 214. Accordingly, the amount of rotation of the winding motor 240 is reduced as the outside diameter of the wound web 212 increases so that the amount of the web 212 wound up by the winding roller 214 can stay 0.2 cm. The control unit 151 rotates the winding motor 240 and controls the amount of rotation in accordance with the voltage Vsns obtained.

In the present embodiment, the winding motor 240 is a stepping motor. The control unit 151 controls the amount of rotation of the stepping motor and thereby controls the winding amount of the web 212 by controlling the number of pulses to be input to the stepping motor.

The winding motor 240 winds up the web 212, and the unused portion of the web 212 is consumed gradually. The web 212 comes to the point of replacement. The storage unit 152 stores the voltage Vb as a voltage for urging the user to replace the web 212, which enables the control unit 151 to determine if the detected voltage Vsns reaches the voltage Vb. This enables the user to determine when to replace the web 212.

Note that the web 212 is a consumable item. When the web 212 to be wound runs out, the web 212 needs to be replaced with a new one. To replace the web 212, it is normally necessary to replace the web unit 210. When the web unit 210 needs to be replaced, the user calls a service-person for the replacement of the web 212. When the web 212 is replaced with the new one, the new web 212 has no wound portion, and the outside diameter for the wound portion of the web 212 becomes zero. Accordingly, the voltage Vsns returns to the vicinity of the voltage Va because the contact member 221 is urged to be in contact with the outside surface of the wound web 212.

In summary, the variable resistor 225 converts the position of the contact member 221 into the resistance. The control unit 151 detects the voltage from the converted resistance and controls the winding motor 240 and the winding roller 214 in accordance with the detected voltage. Compared with a known structure using a solenoid or the like, the structure using the variable resistor 225 and the winding motor 240 of the present embodiment is advantageous because the number of contacts between levers is small. This reduces the occurrence of error caused by the contacts between levers and reduces the amount of the error even if it occurs. As a result, the web 212 can be wound up accurately, which can prolong the life of the web 212.

The following describes advantageous effects of the structure in which the control unit 151 controls the winding motor 240 using the detected voltage Vsns. The control unit 151 controls the amount of rotation of the winding motor 240. Here, the control unit 151 uses the detected voltage Vsns instead of the resistance R12 of the variable resistor 225. The variable resistor 225 is made of a metal. The metal has a general tendency in which the resistance increases as the temperature increases. As a result, the resistance R12 of the variable resistor 225 varies depending on the ambient temperature. If, for example, the control unit 151 controlled the amount of rotation of the winding motor 240 on the basis of the resistance R12, the amount of rotation would vary depending on the ambient temperature. As a result, the winding amount of the web 212 would fluctuate largely. The detected voltage Vsns obtained from Equation 2, however, is less dependent on the ambient temperature compared with the resistance R12. Accordingly, the control unit 151 controls the winding motor 240 on the basis of the detected voltage Vsns. Thus, the winding motor 240 winds up the web 212 accurately.

Abnormality Detection Using Variable Resistor

In the web unit 210 using the variable resistor 225, the winding motor 240 rotates the winding roller 214 to wind up the web 212.

Assume that an abnormality in which the winding roller 214 does not rotate occurs (due to the failure of the motor 240, for example). As a result, the web 212 ceases to be wound up. If there was no method available to detect the abnormality of the web being not wound up, it would be difficult for a user to be aware of this. The image forming continues in the state of the abnormality, and the fixing unit 200 continues to perform fixing. The fixation is performed while the same portion of the web 212 continues to be in contact with the collection roller 204, which leads to insufficient collection of the toner. As a result, the residual toner that has not been collected may adhere to subsequent recording media, which leads to deterioration of image quality. In the present embodiment, however, the abnormality in which the winding roller 214 does not rotate can be detected and reported to the user, thereby reducing the likelihood of deterioration of the image quality. The following describes the detection method in detail.

The variable resistor 225 converts the position of the lever 221*a* into the resistance using multiple gears in the outside-diameter detection device 220. The resistance of the variable resistor 225 changes in accordance with the position of the lever 221*a*. In the present embodiment, as the outside diameter of the wound web increases, the resistance of the variable resistor 225 increases.

When the abnormality of the winding roller 214 not rotating occurs, the outside diameter of the wound web 212 stops increasing. As a result, the resistance of the variable resistor 225 does not change because the outside diameter of the wound web 212 does not increase. The detected voltage Vsns does not change, either. In the present embodiment, when the resistance does not change beyond predetermined limits in a predefined period of time, the control unit 151 determines that the abnormality has occurred and reports this.

Figure 6:
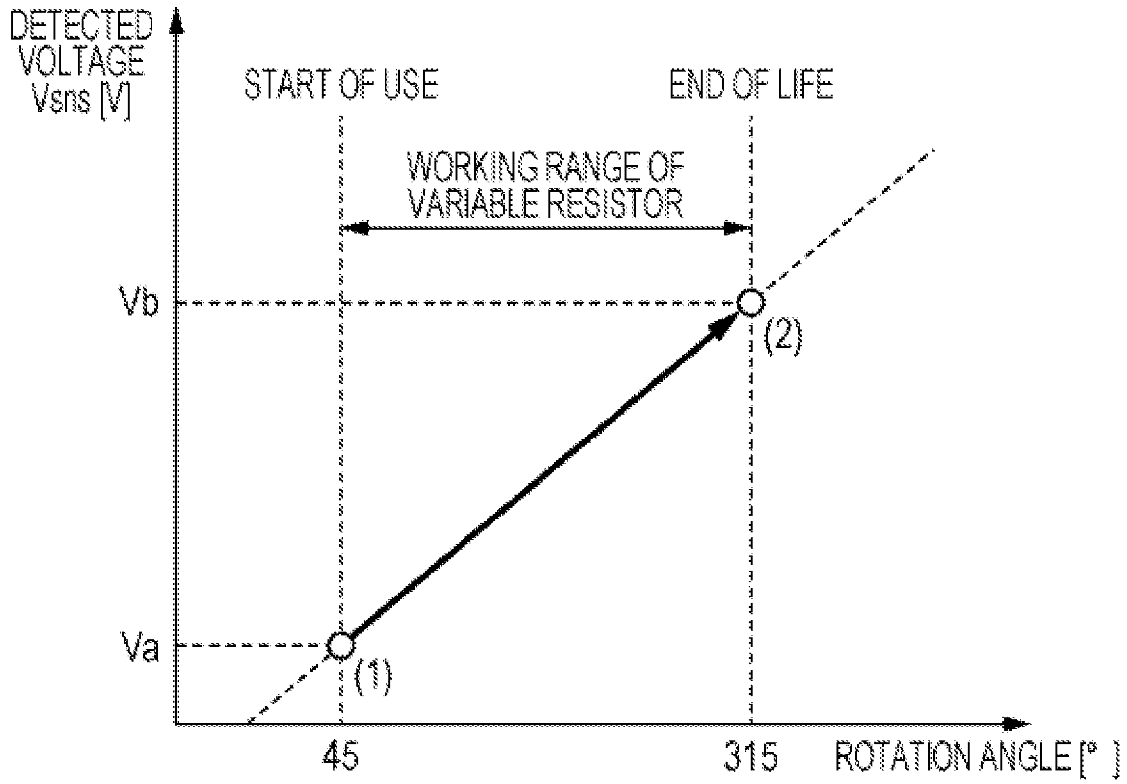
FIG. 6 is a view illustrating a relationship between the rotation angle of the variable resistor and a detected voltage.

The "predefined period of time" as used herein is defined as follows. The predefined period of time here corresponds to a period of time of one rotation of the winding roller 214 to wind up the web 212. The method of calculating the period of time of one rotation is as follows. The control unit 151 detects the detected voltage Vsns. The control unit 151 obtains the outside diameter of the wound web 212 from the graphs in FIGS. 5 and 6 and also obtains the winding amount of the web 212 required for one rotation of the winding roller 214. The control unit 151 predicts the period of time of one rotation on the basis of the winding amount of the web 212 obtained as above. The period of time predicted this way is referred to as the "predefined period of time" in the present embodiment. More specifically, the winding roller 214 winds up the web 212 by 0.2 cm per each operation in the present embodiment. The diameter of the winding roller 214 itself is 12 mm. Accordingly, a minimum predefined period of time corresponds to a period of time of one rotation of the winding roller 214 when the diameter of the web 212 wound around the winding roller 214 is 12 mm.

A threshold value is used in the present embodiment. Even in the state of the abnormality in which the winding roller 214 does not rotate, the detected voltage Vsns may change after the predefined period of time due to an error and resulting variation of information. Accordingly, a threshold can be determined in advance. The control unit 151 can detect the abnormality by determining whether the variation of the detected voltage Vsns before and after the predefined period of time exceeds the threshold. The threshold can be greater than an expected amount of error.

If the detected voltage Vsns exceeds the threshold in the predefined period of time, which is a predicted period of time, the control unit 151 determines that the winding roller 214 rotates properly. If the detected voltage Vsns is below the threshold in the predefined period of time, which is a predicted period of time, the control unit 151 determines that the winding roller 214 does not rotate. The control unit 151 reports that an abnormality has occurred.

In the present embodiment, the predefined period of time is defined as the period of time of one rotation of the winding roller 214 but is not limited to this. The web 212 is thin. Accordingly, even in the case of using the variable resistor 225 or the like, it may be difficult to detect an increase of one-turn thickness in the outside diameter of the wound web 212. In order to detect a change of the outside diameter of the wound web 212 easily, the control unit 151 may predict the period of time of one or more rotations, for example, five rotations, of the winding roller 214 and the control unit 151 may detect the abnormality using this as the predefined period of time.

The control unit 151 obtains the predefined period of time and determines whether the variation of the detected voltage Vsns before and after the predefined period of time exceeds the threshold. Accordingly, the control unit 151 can determine whether the winding roller 214 rotates properly. As a result, the control unit 151 can detect whether an abnormality occurs to the outside-diameter detection device 220 including the winding motor 240.

When the control unit 151 detects the abnormality of the winding roller 214 not rotating, the control unit 151 reports this. As a method of reporting, a display unit 180 can display the nature of the abnormality. This enables the user to know that an abnormality occurs using the display unit 180. The user is aware of the abnormality and can take a measure of suspending the fixing operation in the state of toner not being collected appropriately. For example, the user can call for a serviceperson. In addition to displaying the nature of the abnormality in the display unit 180, a sound may be generated to give notice to the user. Any method of giving notice can be used insofar as the user can be aware of an abnormality occurring.

Image forming is suspended while the control unit 151 detects an abnormality and reports this using an adopted method of giving notice. Suspending the image forming means suspending the image forming process or the print job, in other words, suspending the process starting from the charging until the recording medium S to which the toner image is fixed is discharged onto the discharge tray. The control unit 151 detects the abnormality and suspends the image forming, which enables the image forming to stop in the state of the web 212 not being wound up. This reduces the likelihood of the image quality being deteriorated.

In the state of the winding roller 214 not rotating, the same portion of the web 212 continues to be in contact with the collection roller 204. If the same portion of the web 212 is in contact with the collection roller 204, the web 212 may be broken since the collection roller 204 continues to be rotated passively by the heating rotary member 201. To avoid this, when the control unit 151 detects an abnormality, the web 212 can be separated from the collection roller 204.

Second Embodiment

Next, a second embodiment will be described with reference to FIGS. 7, 8A, and 8B. Description of the same elements as those of the first embodiment will be omitted.

Figure 7:
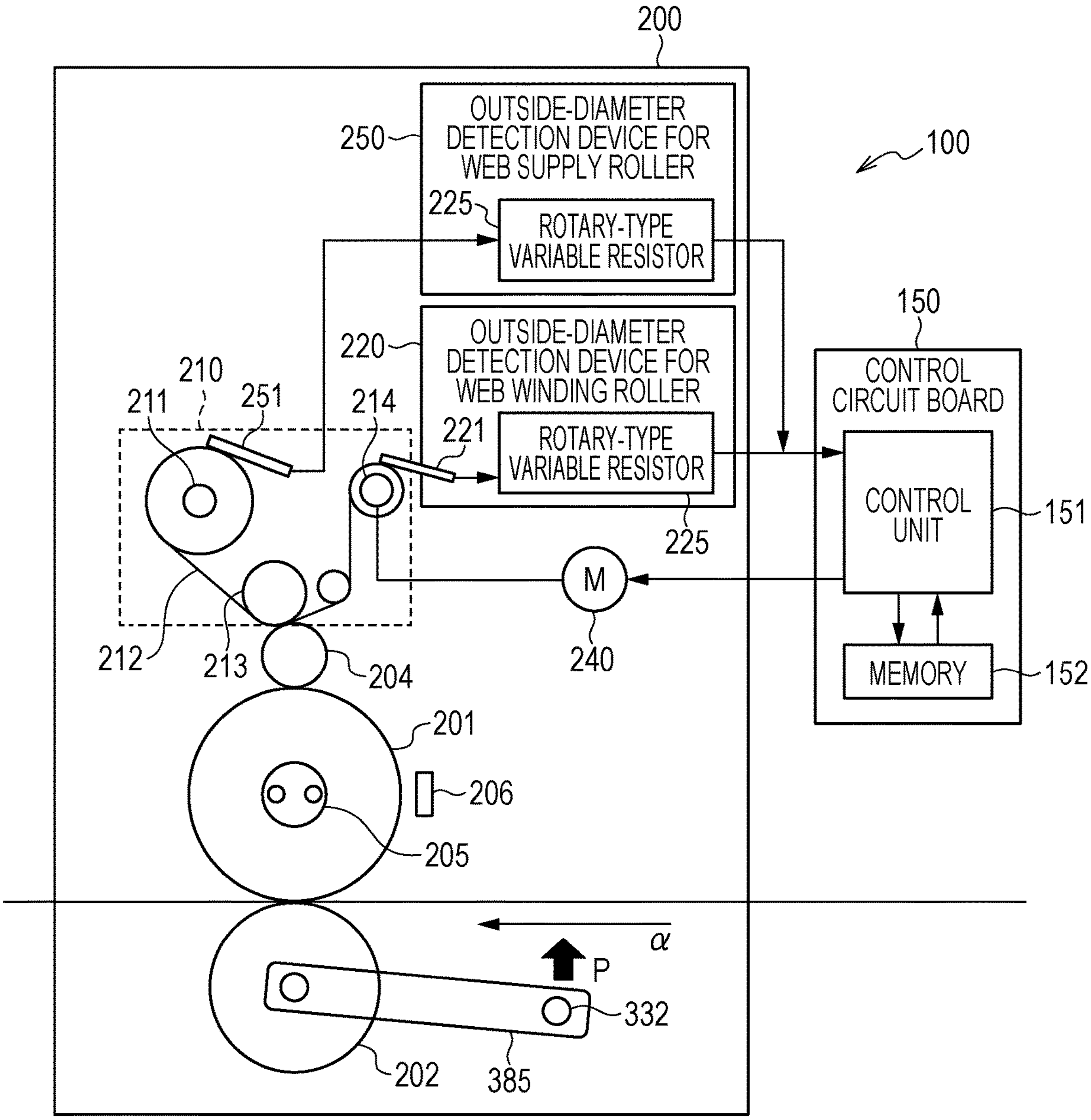
FIG. 7 is a schematic cross-sectional view illustrating a fixing unit and a web unit according to a modification example.

FIG. 7 is a schematic cross-sectional view illustrating a fixing unit according to the second embodiment. FIGS. 8A and 8B are schematic views illustrating an outside-diameter detection device for a supply roller according to the second embodiment.

In the second embodiment, as illustrated in FIG. 7, an outside-diameter detection device 250 is provided to detect the outside diameter of the web 212 wound around the supply roller. The outside-diameter detection device 250 converts the outside diameter into an electric signal using a second variable resistor 225 and outputs the electric signal to the control circuit board 150. FIG. 8A illustrates a state of the outside-diameter detection device 250 when the web unit 210 is new and the web 212 is not sent out yet by the supply roller 211. FIG. 8B illustrates a state of the outside-diameter detection device 250 after the web 212 is sent out by the supply roller 211 in the direction of arrow A' and the outside diameter of the web 212 wound around the supply roller 211 decreases.

Figure 8A:
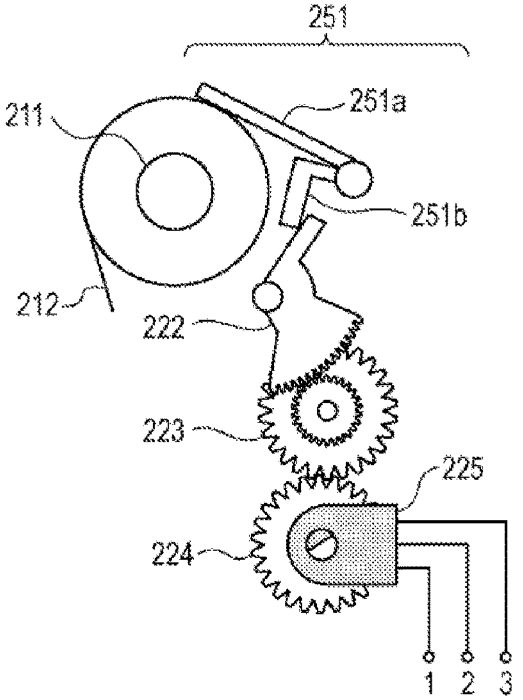
FIGS. 8A and 8B are schematic views illustrating a structure of an outside-diameter detection device according to the modification example.
Figure 8B:
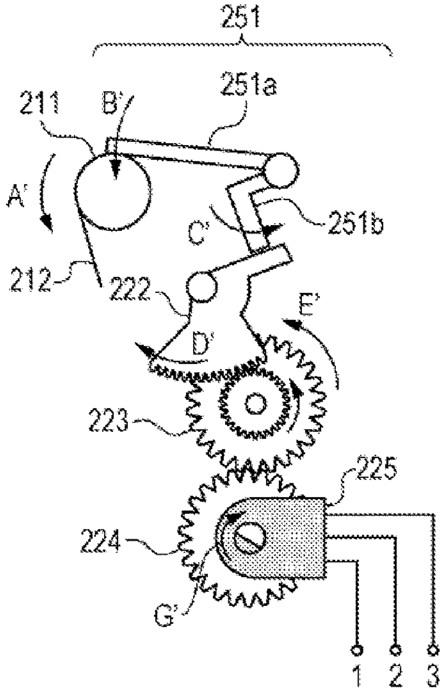

As illustrated in FIGS. 8A and 8B, a contact member 251 of the outside-diameter detection device 250 for the supply roller includes a lever 251*a* that is in contact with, and urged by, the outside surface of the web 212 wound around the supply roller 211. The contact member 251 also includes a portion 251*b* being in contact with a link gear 222. The lever 251*a* of the contact member 251 is rotated in the direction of arrow B' in FIG. 8B by following the outside diameter of the wound web 212. The portion 251*b* of the contact member 251 is thereby rotated in the direction of arrow C', and the link gear 222 is thereby rotated in the direction of arrow D'. The link gear engages a double-gear 223. Accordingly, when the link gear 222 is rotated in the direction of arrow D', the double-gear 223 is thereby rotated in the direction of arrow E'. The double-gear 223 engages a gear portion 224 of the variable resistor 225. The gear shaft of the gear portion 224 of a second variable resistor 225 has a cross section shaped like the letter D, and the gear shaft engages a rotating member 225*a* of the variable resistor 225. Accordingly, when the double-gear 223 is rotated in the direction of arrow E', the rotating member 225*a* of the variable resistor 225 is thereby rotated in the direction of arrow G'. In short, as the winding roller 214 winds up the web 212 and the outside diameter of the wound web 212 decreases, the rotating member 225*a* of the variable resistor 225 is rotated in the direction of arrow G'. The resistance of the variable resistor 225 changes in accordance with the amount of rotation of the rotating member 225*a*. As described above, the second variable resistor 225 used in the second embodiment is a rotary-type variable resistor or a so-called "rotary potentiometer". The outside diameter of the web 212 wound around the supply roller 211 is detected using the rotary-type variable resistor and the contact member.

As described above, as the web 212 is consumed, the outside diameter of the supply roller 211 decreases, and the outside diameter of the web 212 wound around the winding roller 214 increases. The detected voltages Vsns detected by respective variable resistors 225 increase. The outside-diameter detection device 250 for the supply roller detects a change in the detected voltage Vsns when one turn of the web 212 is sent out from the circumference of the supply roller 211. The outside-diameter detection device 220 for the winding roller detects a change in the detected voltage Vsns when one turn of the web 212 is wound around the circumference of the winding roller 214.

When an abnormality of the winding roller 214 not rotating occurs, the outside diameter of the wound web 212 stops increasing. As a result, the resistance of the variable resistor 225 does not change because the outside diameter of the wound web 212 does not increase. The detected voltage Vsns does not change, either. In the second embodiment, the fixing unit 200 includes the outside-diameter detection device 250 that detects the outside diameter of the web 212 wound around the supply roller 211. When the resistance does not change beyond predetermined limits in a predefined period of time, the control unit 151 determines that the abnormality has occurred and reports this.

Regarding the variation of the detected voltage Vsns, a smaller diameter one of the supply roller 211 and the winding roller 214 responds more quickly. In the first embodiment in which the supply roller 211 is not equipped with the outside-diameter detection device 250, if the outside diameter of the winding roller 214 becomes larger than the outside diameter of the supply roller 211, it takes a longer period of time to detect the abnormality. In the second embodiment, however, the supply roller 211 is equipped with the outside-diameter detection device 250. Accordingly, the control unit 151 can detect the abnormality using the detected voltage Vsns of the smaller diameter one of the supply roller 211 and the winding roller 214.

With the above-described embodiment, if an abnormality occurs in the contact member, in the winding motor 240, or in the outside-diameter detection device 220 (the outside-diameter detection device 250), the abnormality can be detected and reported quickly even in a later stage of the service life of the web 212, which can reduce the likelihood of deterioration of the image quality due to the web not being supplied.

While the present invention has been described with reference to embodiments, it is to be understood that the invention is not limited to the disclosed embodiments but is defined by the scope of the following claims.

This application claims the benefit of Japanese Patent Application No. 2021-186663, filed Nov. 16, 2021, which is hereby incorporated by reference herein in its entirety.

What is claimed is:

1. An image forming apparatus comprising:

a heating rotary member;

a pressing rotary member, wherein the pressing rotary member and the heating rotary member are configured to form a fixing nip portion, and are configured to apply heat and pressure to a toner image carried on a recording medium at the fixing nip portion, thereby fixing the toner image onto the recording medium;

a winding roller configured to wind up a web used to collect toner that is not fixed to the recording medium and is adhered to a surface of the heating rotary member;

a motor configured to rotate the winding roller to wind up the web that has been used for the collection of the toner;

a contact member configured to contact an outside surface of the web wound around the winding roller and to be movable so as to follow the outside surface of the web;

a variable resistor disposed so as to be able to change a resistance in accordance with a position of the contact member; and a control unit configured to control an amount of rotation of the motor in response to information related to the resistance, wherein the control unit is configured to report an abnormality when an amount of variation of the information in a predetermined time period is equal to or less than a predetermined amount, wherein the predetermined time period is set to correspond to a period of at least one rotation of the winding roller.

2. The image forming apparatus according to claim 1, further comprising a reporting unit configured to report the abnormality.

3. The image forming apparatus according to claim 1, further comprising a display unit configured to display a nature of the abnormality.

4. The image forming apparatus according to claim 1, further comprising a collection roller configured to collect toner from the heating rotary member, the toner being not fixed to the recording medium and being adhered to the heating rotary member, wherein the web is configured to collect the toner adhered to the collection roller from the collection roller.

5. The image forming apparatus according to claim 4, wherein the web and the collection roller are separated from each other in a state of the control unit reporting the abnormality.

6. The image forming apparatus according to claim 5, wherein image forming is suspended in the state of the control unit reporting the abnormality.

7. The image forming apparatus according to claim 1, wherein the control unit is configured to obtain a voltage from the resistance of the variable resistor, and wherein the control unit is configured to control the amount of rotation of the winding motor in accordance with the voltage.

8. The image forming apparatus according to claim 1, wherein the contact member includes a lever that is connected to the variable resistor using one or more gears and is in contact with the outside surface of the web wound around the winding roller.

9. The image forming apparatus according to claim 1, wherein the variable resistor includes a rotating member that rotates so as to follow movement of the contact member, and wherein the variable resistor is configured to change the resistance in response to an amount of rotation of the rotating member.

* * * * *